(12) United States Patent
Blume

(10) Patent No.: US 7,081,885 B2
(45) Date of Patent: Jul. 25, 2006

(54) SYSTEM FOR ENHANCING BOOKS

(75) Inventor: Leo Blume, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 260 days.

(21) Appl. No.: 10/210,559

(22) Filed: Jul. 31, 2002

(65) Prior Publication Data
US 2004/0021648 A1  Feb. 5, 2004

(51) Int. Cl.
G09G 5/00 (2006.01)
(52) U.S. Cl. .................... 345/173; 178/18.03
(58) Field of Classification Search ............... 345/173, 345/179; 434/167, 178, 317; 369/31; 178/18.03
See application file for complete search history.

(56) References Cited

U.S. PATENT DOCUMENTS

| 4,802,092 | A | * | 1/1989 | Harte ........................ 434/340 |
| 4,884,974 | A | | 12/1989 | DeSmet |
| 4,993,558 | A | | 2/1991 | Assael |
| 5,466,158 | A | | 11/1995 | Smith, III |
| 5,575,659 | A | * | 11/1996 | King et al. ................. 434/167 |
| 5,631,883 | A | | 5/1997 | Li |
| 5,666,139 | A | * | 9/1997 | Thielens et al. ............ 345/173 |
| 5,795,213 | A | | 8/1998 | Goodwin |
| 5,810,604 | A | | 9/1998 | Kopp, Jr. |
| 5,945,656 | A | * | 8/1999 | Lemelson et al. ...... 235/462.01 |
| 6,052,117 | A | | 4/2000 | Ohara |
| 6,201,947 | B1 | | 3/2001 | Hur et al. |
| 6,297,812 | B1 | | 10/2001 | Ohara et al. |
| 6,608,618 | B1 | * | 8/2003 | Wood et al. ................ 345/173 |
| 6,636,203 | B1 | * | 10/2003 | Wong et al. ................ 345/173 |
| 6,668,156 | B1 | * | 12/2003 | Lynch et al. ................ 434/317 |

* cited by examiner

Primary Examiner—Kent Chang

(57) ABSTRACT

A system for audio- or video-enhancement of books or other reading material includes a substantially transparent guide sheet, a pointing device, and a broadcast device. The guide sheet is configured to be placed over or under and aligned with a selected page. The user touches the pointing device on the guide sheet or the page, and the broadcast device determines the position of contact, and provides audio and/or video output corresponding to contents of the book at the contacted location. The system may include an active guide sheet and passive pointing device, or an active pointing device and passive guide sheet, or both an active pointing device and an active guide sheet.

28 Claims, 3 Drawing Sheets

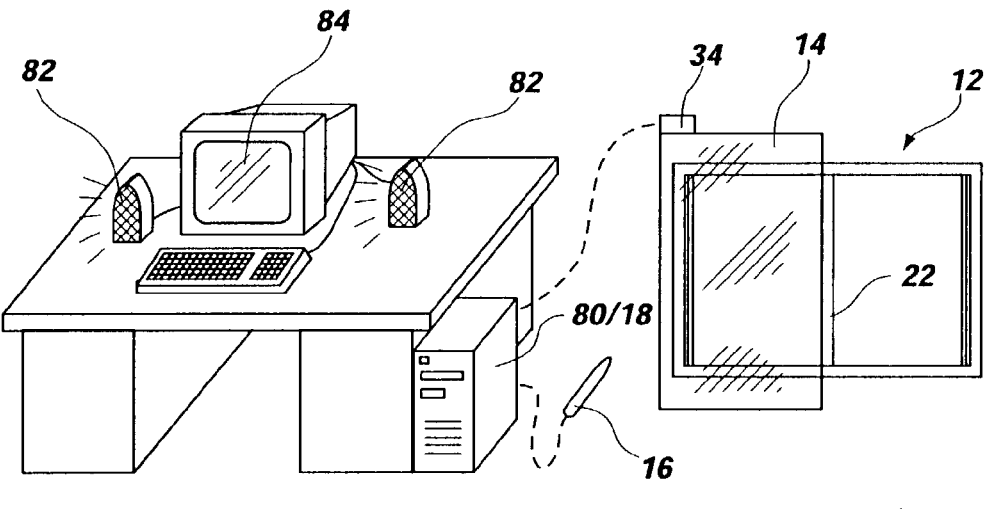
FIG. 3
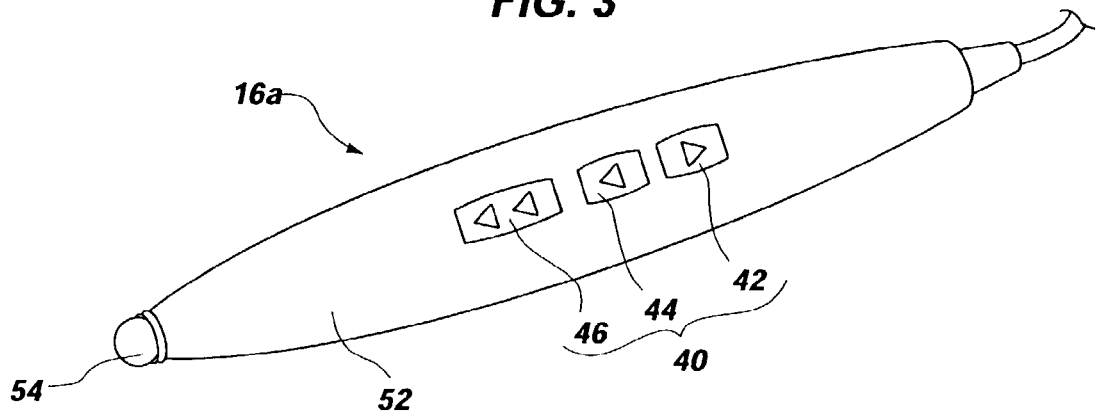
FIG. 4
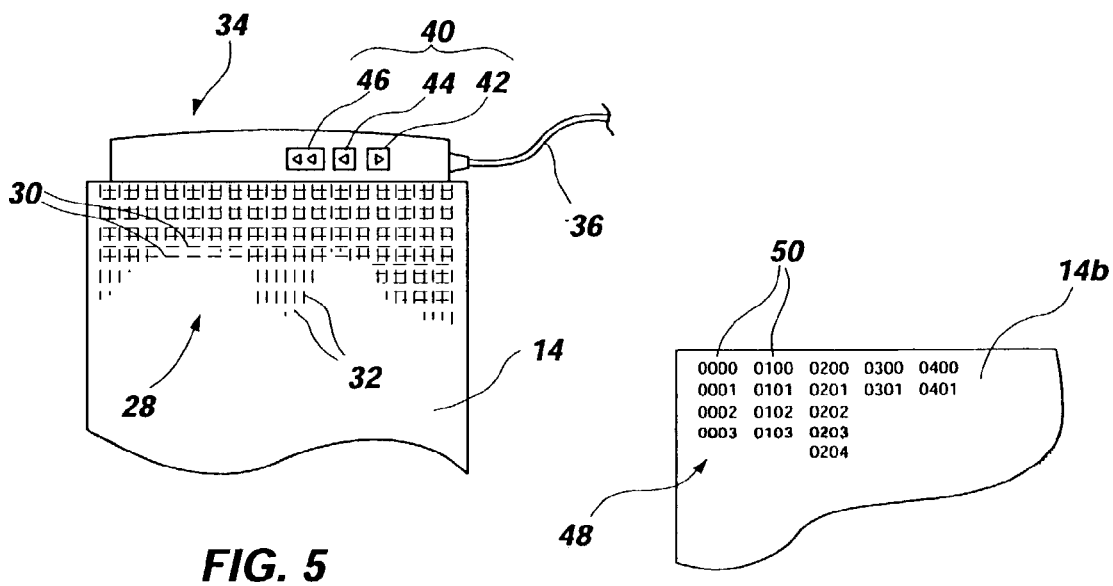
FIG. 5
FIG. 6

SYSTEM FOR ENHANCING BOOKS

BACKGROUND OF THE INVENTION

1. Field of the Invention

The present invention relates generally to enhancement for books or other written material. More particularly, the present invention relates to a system for providing audio and/or video corresponding to specific printed content of a page when the user makes pointing contact with the location of the content on the page.

2. Related Art

Traditional books, magazines, newspapers, and other printed matter are silent and static—they cannot voice or display their own contents. Some methods have been developed to provide audio and/or video associated with printed matter. For example, there are books on audiotape, CD, and other media that provide the audible contents of the book. There are also computer systems and programs that provide the text of a book on a computer screen, and which may highlight words as they are read, provide audio and visual depictions of the book content, etc. In some of these systems, a user can click on a word or image to have it defined in writing, or have it spoken audibly. However, these types of systems are not books—they lack the visual dimension and tactile features of an actual book.

There are also books having a synchronized audio sound track or audio/visual representation on a tape, CD, DVD, etc., which allow a reader to follow along in the book (e.g. "turn the page when you hear the BEEP") while hearing the sounds or seeing visual depictions of the content. However, these systems generally require the reader to progress at the pace of the recording.

There are also systems that use a scanner to determine the location of a stylus on a page of paper that is printed with a special, frequently invisible, pattern. However, these sorts of systems have been developed for writing but not reading, and require specially prepared paper. These do not work with conventional published books or other printed matter.

However, many people would benefit from books if they could provide their contents in audible form. For example, children who are pre-readers or who are learning to read could benefit from books and other printed material that provide audio and/or video output. Likewise, visually impaired readers, and readers of difficult content or foreign languages could also benefit from such a system.

SUMMARY OF THE INVENTION

It would therefore be advantageous to develop a system for providing audio or visual enhancement for books or other printed matter that functions with conventionally printed or published materials, and allows the continued use of the traditional media.

It would also be desirable to have a system for providing enhancement for books or other printed matter that is self-paced, and in which the contents of the printed page cues the sounds or images.

The invention provides a system for enhancement of books or other reading material. The system includes a substantially transparent guide sheet, a pointing device, and a broadcast device. The guide sheet is configured to be placed over and aligned with a selected page of a book. The user touches the pointing device on the guide sheet, and the broadcast device determines the position of contact, and provides audio and/or visual output corresponding to contents of the book at the contacted location.

In accordance with a more detailed aspect of the present invention, the system may include an active guide sheet and passive pointing device, or an active pointing device and passive guide sheet, or both an active pointing device and an active guide sheet.

In accordance with another more detailed aspect of the invention, the system may use optical character recognition software to detect or help detect the location of contact based upon images on the page.

In accordance with still another more detailed aspect of the invention, the broadcast device may be interconnected to a computer network, such as the Internet, which provides a means for receiving book content.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 3 is a perspective view of yet another alternative embodiment of a system according to the present invention wherein the broadcast device comprises a personal computer.

FIG. 4 is a close-up perspective view of a stylus configured for use with various embodiments of the system of the present invention.

FIG. 5 is a partial plan view of the sensor circuitry of the guide sheet of FIG. 1.

FIG. 6 is a partial plan view of the passive guide sheet of FIG. 2, showing one embodiment of the optically readable grid.

DETAILED DESCRIPTION

Figure 1:
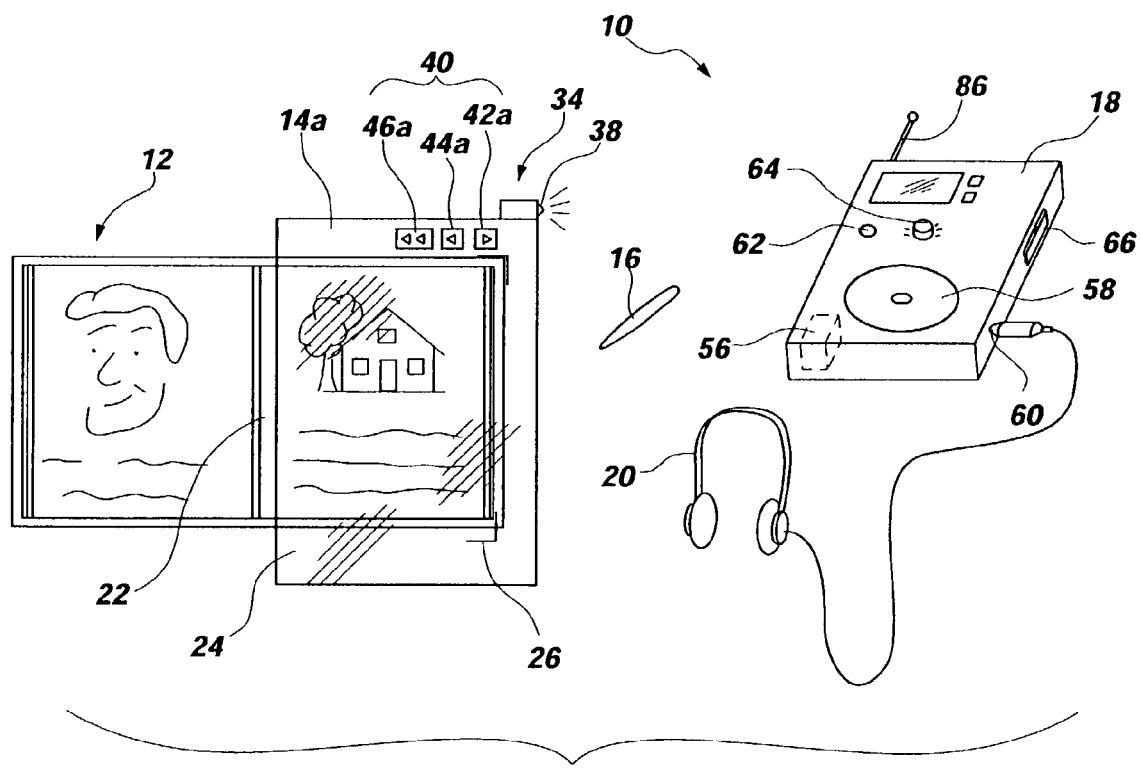
FIG. 1 is a perspective view of one embodiment of a system for enhancement of books in accordance with the present invention, having an active guide sheet and passive pointing device.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention advantageously provides a system that provides audio and/or video from printed matter—books, magazines, etc. Advantageously, the system allows the combination of audio and other output from legacy books—traditional books that simply comprise words and images printed on paper pages. The output may be a spoken representation of words on the page, a spoken translation of words on the page, a spoken definition of words or symbols on the page, musical flourishes or sound effects corresponding to words, symbols or illustrations on the page, audio recordings of actual quotes by the one being quoted, the performance of musical notes on the page, or any other audio and/or video feature that enhances the use or effect of the printed matter. Video in this context can represent anything that might appear on a computer or television screen including additional text, animations, and imagery, both still and moving. The audio and/or video may be non-interactive or they may be presented in a way that is itself interactive. Likewise, the invention can provide any desired type of video content related to the text. For purposes of this discussion, the term "book" will be used to refer to any type of printed media used with the system of this invention, including books, magazines, newspapers, individual printed pages, etc., and the term "image" will refer to anything printed on the page.

Shown in FIG. 1 is one embodiment of a system 10 for enhancement of a conventional book 12 or other printed media in accordance with the present invention. As shown in FIG. 1, the system 10 generally includes a guide sheet 14, a pointing device 16, and an output device 18. As depicted in the drawings, the guide sheet is generically labeled 14, with various specific embodiments of it labeled 14*a*, 14*b*, etc. The guide sheet is configured to be placed in contact with a page 22 of the book 12, to allow coordinate locating of images on the page. In the embodiments depicted in FIGS. 1–3, the guide sheets 14*a* and 14*b* are transparent, and are configured to be placed over the respective page 22 of the book 12. However, viewing FIG. 7, in an alternative embodiment, the guide sheet 14*c* can be configured to be placed under the respective page 22 (or multiple pages), in which case it need not be transparent.

Figure 7:
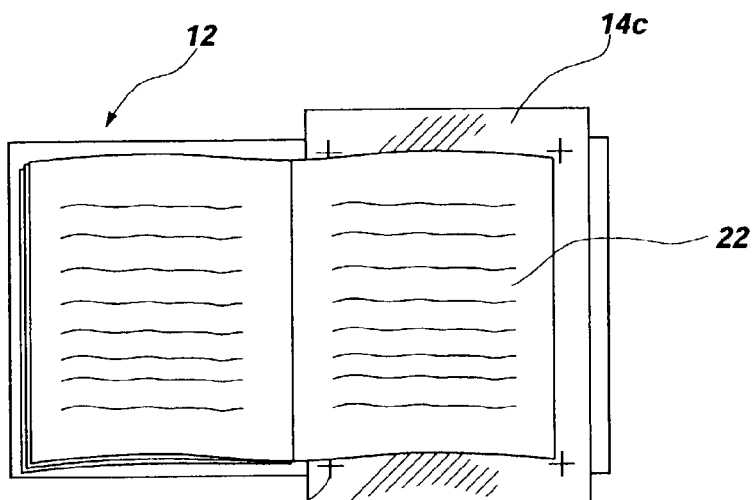
FIG. 7 is a perspective view of another embodiment of a system for enhancement of books in accordance with the present invention, wherein the guide sheet is placed under the page of the book.

The pointing device 16 is used to interact with the top surface 24 of the guide sheet 14, whether by direct physical contact (as in the case of FIGS. 1–3, where the guide sheet is atop the page) or indirect contact (as in the case of FIG. 7, where the page is placed atop the guide sheet). In the case where the guide sheet is placed under the page, the guide sheet may be configured with enough sensitivity to be placed under several pages. In some cases, it may be possible to position the guide sheet under the entire book and to integrate it with a frame for holding the book, as discussed below. The guide sheet also includes alignment marks 26 for aligning it with the page 22.

The guide sheet 14 incorporates a mechanism which, in combination with the pointing device 16, detects the X/Y position or location of interaction (i.e. horizontal and vertical coordinates) of the pointing device with the top surface 24 of the guide sheet.

In using the system, the guide sheet is first placed over or under and aligned with the selected page 22 of the book 12. After providing information to the output device 18 giving the book identification and page number (discussed below), the user taps or presses the pointing device 16 on the guide sheet or the page at any location atop a word, image, or other printed item on the page. The contact with the guide sheet, whether direct or transmitted through the page 22, allows the system to detect the X/Y location that the user has contacted, and uses this information (representing the position on the page) in combination with the identification of the page to index into a database of information, such as the audio track for the book. The output device 18 then broadcasts the audio and/or video output retrieved from the database. When reading through a book sequentially in the typical manner, the user simply taps on each word in turn, or, alternatively, drags the stylus over the words on the guide sheet, to prompt the system to audibly broadcast each word at whatever pace the user desires. When the user points to an illustration or other image, the system may provide sound effects, music, explanation, or any other desired audio and/or video output.

The X/Y detection mechanism may be configured in a variety of ways. The system may have an active guide sheet and passive pointing device, or an active pointing device and passive guide sheet, or both an active pointing device and an active guide sheet. In the embodiment depicted in FIG. 1, the guide sheet 14*a* is an active guide sheet, and the pointing device 16 is passive. In this embodiment, the pointing device is a stylus that simply provides a rigid pointer for tapping on the guide sheet. It will be apparent that the pointing device could alternatively comprise the user's finger, a pen, or any other item that can be manipulated by a user to contact a specific location on the guide sheet.

Referring also to FIG. 5, the guide sheet 14 advantageously includes an active coordinate sensing grid or network 28 that detects the point of contact (X/Y coordinates) of the stylus. The sensing grid comprises transparent horizontal and vertical conductors 30 and 32, which create an active conductive, magnetic, or capacitive sensor grid similar to those currently used in a variety of touch-screen devices, such as PDA's and the like. By contacting the guide sheet with a pointing device, the user alters either the capacitance or conductance of the conductors at the location of contact. This alteration is detected by a microprocessor, which can then determine the relative location of the contact in X and Y coordinates by comparing the relative change in signal from the horizontal and vertical conductors, respectively.

Referring to both FIG. 1 and FIG. 5, the active guide sheet 14*a* is electronically interconnected to the output device 18 through a connector 34. The connector includes circuitry that collects signals from the horizontal and vertical conductors 30 and 32, and transmits these signals to the output device, which interprets the signals as positional information. The connector communicates with the output device through either a hard wire connection 36 (shown in FIG. 5), or a wireless data communication port 38 (shown in FIG. 1). The wireless data communication port may be configured to transmit either RF or infrared signals to the output device in a manner well known in the art. Electrical power for the active guide sheet and the connector may be obtained from internal sources (e.g. batteries) or from an external source (either wired or wireless).

The active guide sheet 14*a* and connector 34 may also include additional features. In the embodiment of FIG. 5, the connector includes system controls 40 in the form of mechanical push buttons, such as a page-advance button 42, a page-back button 44, and a return-to-beginning button 46. It will be apparent that other buttons (not shown) for functional controls may also be included as part of the connector, including controls for the output device, as described below. Moreover, in the embodiment of FIG. 5, because the connector is a relatively large physical structure, it can function as a handle for carrying or otherwise physically manipulating the guide sheet.

As shown in FIG. 1, the desired system controls 40 may alternatively comprise discrete touch regions 42*a,* 44*a,* and 46*a,* which are designated by printed indicators on the top surface 24 of the active guide sheet 14*a.* As with the mechanical push buttons, these printed indicators may include a page-advance button (42*a*), a page-back button (44*a*), and a return-to-beginning button (46*a*). Also, as with the mechanical push buttons, other system controls may also be operated through additional discrete touch regions (not shown) imprinted on the guide sheet.

Figure 2:
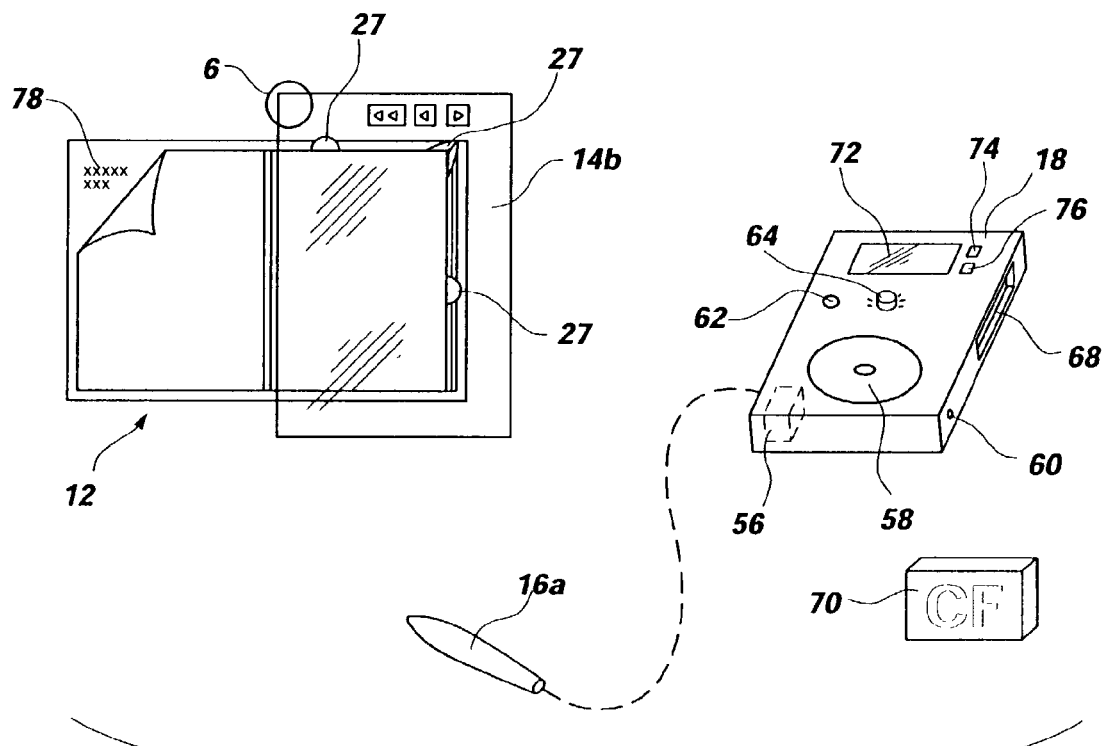
FIG. 2 is a perspective view of an alternative embodiment of a system according to the present invention having a passive guide sheet and active pointing device.

As noted above, the X/Y detection mechanism may be alternatively configured with an active pointing device and passive guide sheet. One embodiment of this configuration is depicted in FIG. 2. In this embodiment, the passive guide sheet 14*b* includes alignment marks 26 for aligning it with the page 22, as in the other embodiments. However, the passive guide sheet has no electrical components or connection to any other device. Instead, it includes an X/Y grid 48 that is machine-readable by an optical scanner or comparable device, but (preferably) is not visible to the user. The grid 48 may take many forms. In perhaps its simplest form, shown in FIG. 6, the grid comprises coordinate numbers 50, which directly indicate the X/Y coordinates of the location of the number. It will be apparent that the smaller the physical representation of the numbers 50, the greater will be the sensing accuracy of the grid 48. Of course, the coordinate identifiers need not be literal decimal numbers but may be any encoding from which the X/Y coordinates can be derived. For example, the coordinates so encoded can be the absolute binary representation of the distance as measured, for example, from one corner of the guide sheet. The symbols used to express these coordinates may be from any symbol set including the common ISO-LATIN character set commonly used for English writing or some other symbology (like bar code).

In the embodiment of FIG. 2, the active pointing device 16*a* comprises a pen-shaped stylus 52 that includes an optical scanner 54, similar to bar code readers and other optical scanning devices that are well known. This stylus is shown in more detail in FIG. 4. The active stylus 52 is electrically interconnected (ether hard-wired or wirelessly, in a manner similar to the active guide sheet 14*a*, as discussed above) to the output device 18. As with the active guide sheet 14*a*, the active stylus may include additional features, such as system controls 40, including a page forward button 42, a page back button 44, and a go-to-beginning button 46, as discussed above. Other controls could also be included on the active stylus.

When the user touches the active stylus 52 to a given location on the passive guide sheet 14*b*, the optical scanner 54 detects the configuration or contents of the grid 48 at that particular location. This information is transmitted to the output device, which translates the scanned grid configuration as the X/Y location of the stylus relative to the guide sheet, which in turn indicates the location on the page 22 of the book.

As noted above, the guide sheet 14 must be properly aligned with the page 22 of the book 12 for the system to function properly. In the embodiments of FIGS. 1 and 7, alignment marks 26 are provided for this purpose, as described above. However, viewing FIG. 2, instead of alignment marks the guide sheet may include alignment guides 27 for ensuring proper alignment with the book. The alignment guides are generally planar tabs that protrude from the surface of the guide sheet, either from the top surface or the bottom surface, in line with the intended edge of the page. The alignment guides may be permanently attached to the guide sheet, or they may be removable. They may also be moveable in position or geometry to allow reconfiguration for books of various sizes and shapes. The purpose of these physical guides is to secure the guide sheet to and align it with the book 12.

Figure 8A:
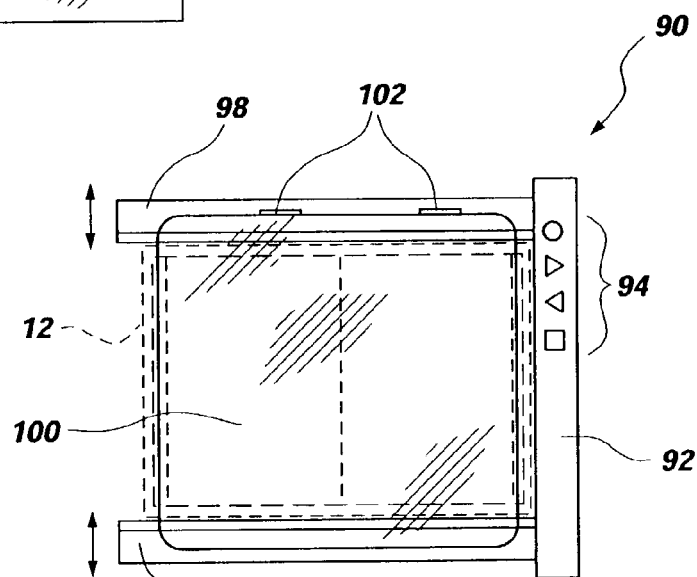
FIG. 8A is a top view showing an embodiment of the invention with an adjustable frame which holds and aligns the book.
Figure 8B:
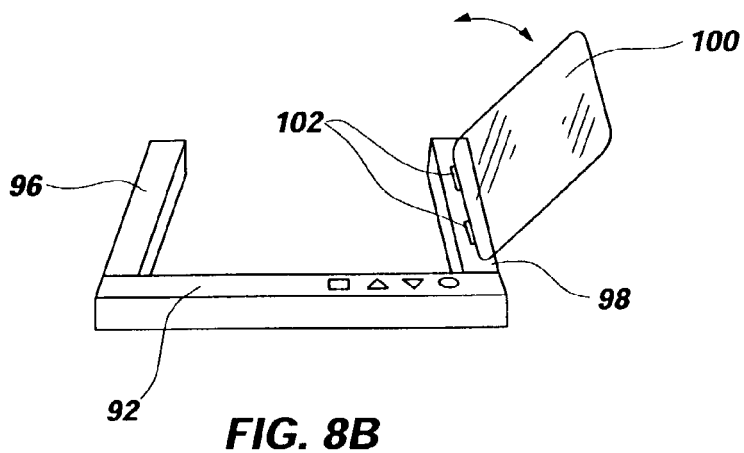
FIG. 8B is a perspective view of the embodiment of FIG. 8A.

Another design for providing moveable alignment guides is shown in FIGS. 8A and 8B. This embodiment includes a frame 90 that may be connected to the back of the book, if the book has a surface suitable for such mounting. Otherwise, the frame is configured to be disposed around the book. The frame includes a side bar 92 with controls 94, such as on/off, forward, back, etc., as described above, and two moveable arms 96, 98. The moveable arms allow the space between the arms to be adjusted to accommodate the particular size of the book 12 (shown in dashed lines in FIG. 8A). A guide sheet 100 is connected to one of the moveable arms via hinges 102.

In use, the frame 90 is placed around the open book 12, with the right edge of the book against the side bar 92, and the moveable arms 96, 98 moved against the top and bottom edges of the book, respectively. The guide sheet 100 is rotated down over the book, and used in the manner described above. The hinged connection of the guide sheet allows it to be rotated upwards (as depicted in FIG. 8B) and out of the way during page turns, without adjusting the position of the frame relative to the book. The embodiment of FIGS. 8A and 8B may also be configured to place the guide sheet under one or more pages.

The output device 18 is the brains of the system. It can be configured in various ways, as shown in FIGS. 1–3. Referring to FIG. 1, at a minimum, the output device includes a microprocessor 56 and an audio speaker 58. Alternatively or additionally, the output device may include a connector 60 for audio headphones 20. It will be apparent that the microprocessor and audio speaker need not necessarily be disposed in the same housing. The microprocessor receives and interprets the signals from either the active guide sheet 14*a* or the active stylus 52 (depending upon the particular configuration of the system), and determines the X/Y coordinates of the location of the user's contact with the page. Based upon this information, the microprocessor retrieves and broadcasts over the audio speaker 58, from a database containing audio information associated with the book 12, an audio segment associated with the X/Y coordinates of the page. As noted above, the audio segment may be a single spoken word or syllable, a sound, music, or any other audible information. The entire process of detecting, selecting, and broadcasting, takes only a fraction of a second, so as to seem essentially simultaneous to the user. The output device 18 also includes general system controls, such as an on/off button or switch 62, and a volume control knob 64.

It will be apparent that in order to retrieve and broadcast the appropriate output, the output device must include or have access to the database of information related to the book. In addition, certain input is required besides the X/Y location information. The page number within the book must be known, and, if the system has access to more than one database of information, the user must somehow prompt the system to know which book has been selected (i.e. the identity of the reading material). There are many ways these functions can be accomplished. With reference to FIG. 1, in the simplest embodiment, a database of audio information related to the book may be stored in memory associated with the microprocessor 56. This storage may be permanent (i.e. the database is included in ROM associated with the microprocessor 56), though such a configuration is somewhat inflexible. Alternatively, the output device may include a cable connection port 66 which is configured to allow interconnection to one or more other devices (e.g. a computer or specialized digital device) from which the desired database may be selectively loaded into RAM associated with the microprocessor.

With reference to FIG. 2, as yet another more flexible alternative, the output device 18 may include a digital media slot 68 for removably receiving a digital memory device 70, such as a flash memory card, on which is stored the database of information related to one or more books. Where the database for just one book is stored on one removable media card, the user identifies the book to the system simply by selecting the media card corresponding to the book and inserting it into the media slot. However, where the database for more than one book is included on one media card, additional features are required. As shown in FIG. 2, the output device may include a small display screen 72 (e.g. a small LCD display), which, upon insertion of the digital memory device, allows the user to scroll through and sequentially highlight the book titles in a list using a scroll button 74. When the desired title is highlighted, the user then selects it by pressing a select button 76, or by tapping on the display screen with the pointing device 16, or using some other action to identify the desired database.

Alternatively, devices of this type may have an audio capability that permits the book titles in the list to be spoken by the device as a way of augmenting or replacing the visual scrolling list. In still other implementations, book titles may be selected by having the user speak the name of a book where the user-spoken name is interpreted by speech recognition software and/or hardware on the device.

Alternatively, in the embodiment comprising an active stylus 52 having an optical scanner 54, the microprocessor can be provided with optical character recognition (OCR) software that allows direct book identification to the system by scanning and machine-reading a unique number or code (78 in FIG. 2) printed on or associated with the book. This number could be the International Standard Book Number (ISBN), the Universal Product Code (UPC), or the Library of Congress Card Catalog Number, for example.

In yet another alternative embodiment, depicted in FIG. 3, the output device 18 may comprise a computer 80 that is connected to the Internet, and the database of audio or visual information related to the book is retrievable through a special server that delivers audio and/or video for this application. If the audio and/or video is delivered over the Internet, the user goes to the appropriate Internet site using the computer, and identifies the book 12 by either selecting from a list of titles on the internet site, or by inputting or scanning a book identifier in the manner discussed above.

Once the book is identified, the user provides the system with the page number, and the system operates as discussed above, except that the microprocessor that is associated with the computer 80 operates as the output device, and the broadcast speaker(s) 82 is/are connected to the computer. Video resources can also be accessed and displayed over the computer monitor 84 to provide an interactive audio/visual system. It will be apparent that the system depicted in FIG. 3 may utilize either the active guide sheet and passive stylus configuration, or the active stylus and passive guide sheet configuration discussed above.

The system embodiments described above and depicted in FIGS. 1–3 and 7 can be designed so that certain actions with the pointing device 16 provide specific input to the system. For example, the desire to turn or advance the page may be indicated to the microprocessor through a double tap with the stylus 16 on the guide sheet 14, either in a designated location or anywhere. A triple tap on a given location might indicate a user request for a translation or definition of a word, or explanation of a figure. Additionally, page forward and page back buttons can be integrated into the guide sheet, the output device 18, or the stylus, as discussed above. These particular gestures are illustrative of the various gestures that can be associated with different functions of the device. Beyond counting the number of taps, the duration or intensity of a tap or the pattern of a sweeping gesture might have an assigned meaning in this context. Still others are possible. Advantageously, the system may also include hardware or software that performs a debouncing function (similar to that performed on a standard keyboard). Debouncing prevents spurious, unintended gestures from being interpreted as a valid input request.

Where optical character recognition (OCR) capability exists, additional features are also possible. Optical character recognition capability can allow random page access by scanning a page number. However, it is important to remember that even with OCR, the system still uses the X/Y location detection to determine the content to be played. This system is distinct from the use of OCR alone because it works on any content—text, symbols and pictures. This invention works with any content because it isn't really reading the content—it is simply reading the location on the page, and translating that to a reference to a database containing information for the book.

This OCR-enhanced system can also be configured to increase robustness of the system by comparing scanned text versus the text associated with the detected X/Y location on the guide sheet 14. This increases the accuracy of determination of the position of contact of the stylus 16 by comparing the detected position of contact and the content associated therewith, with the content actually detected by the optical character recognition software. Accordingly, slight misalignment of the guide sheet with the page 22, or other errors can be detected and automatically corrected.

This system enriches the reading experience by adding to books a new dimension for learning and entertainment. It is simple enough that a child can use it, and it is compatible with a large body of existing media (books, magazines, etc.), which require no modification. It can be used with children's books, foreign language instructional texts, books that introduce new vocabulary (technical, medical, legal, etc), and provide speaking books for the visually impaired. Using a system of this sort, children can read books, with minimal adult involvement, which can provide an aid in early reading skills acquisition. Additionally, people frequently have the need to read technical books and articles in languages other than their own. This system permits them to read these books with greater ease and understanding.

Many other applications are also possible. The system can be used for interactive applications, such as tests, automatically updated newspapers, and speed-reading training. For example, a person taking a multiple choice test may place the guide sheet over their exam paper, and select their chosen answers by tapping on the guide sheet atop the selected answer. Audio feedback (such as through audio headphones) could be provided for purposes such as to give the definition of a word in a test question, and to confirm which answer the student has actually selected. Such a system could also be used for essay examinations. Imaging software associated with the system could create, from the time-based detection of contact with coordinates on the guide sheet, an image of the student's writing. Advantageously, in both of these embodiments, the tests can be reviewed and graded electronically, thus using less paper.

Viewing FIG. 1, with a newspaper, the audio broadcast device 18 can be equipped with an antenna 86, which provides a wireless connection to the Internet, allowing the user to obtain current audio updates related to stories appearing in the newspaper as the reader reads them. Alternatively, the desktop computer embodiment of FIG. 3 could also provide this sort of function. With speed-reading training, the reader can receive audio feedback that pronounces the words, or feedback indicating his reading speed. Other uses may also be discovered for the system of this invention.

It is to be understood that the above-referenced arrangements are only illustrative of the application of the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A system for enhancement of books, comprising:
   a) a guide sheet, configured to be aligned with and placed on top of, underneath, and between selected pages of pre-existing media and configured to interact with a pointing device to jointly identify the relative position of the pointing device with respect to the guide sheet; and b) a broadcast device, configured to receive the relative position of the pointing device with respect to the guide sheet, and to provide output corresponding to contents of the page at the identified location.

2. A system in accordance with claim 1, wherein the pointing device is selected from the group consisting of a stylus that is functionally interconnected with the broadcast device, and the reader's finger.

3. A system in accordance with claim 2, wherein the pointing device is a stylus comprising an optical scanner configured to scan page coordinate symbols on the guidesheet.

4. A system in accordance with claim 3, further comprising optical character recognition software associated with the broadcast device, whereby content on the page may be electronically detected.

5. A system in accordance with claim 4, further comprising:
a) a positional detection system associated with the guide sheet, configured to detect the relative position of the stylus; and
b) wherein the broadcast device is configured to compare known content from the detected position of the stylus with the content detected by the optical character recognition software, so as to increase the accuracy of determination of the position of the stylus.

6. A system in accordance with claim 2, wherein the stylus further comprises operational controls for the broadcast device.

7. A system in accordance with claim 1, wherein the guide sheet includes a positional detection system for detecting the relative position of the pointing device.

8. A system in accordance with claim 7, wherein the positional detection system is selected from the group consisting of conductive contact sensors, capacitive contact sensors, magnetic sensors, and an optically detectable position pattern.

9. A system in accordance with claim 1, wherein the output is selected from the group consisting of a spoken representation of a word on the page, a spoken translation of a word on the page, a spoken definition of a word on the page, a sound associated with an image on the page, a still image, and a video image.

10. A system in accordance with claim 9, wherein the sound associated with an image on the page of the book is selected from the group consisting of music and sound effects.

11. A system in accordance with claim 1, wherein the broadcast device further comprises means for interfacing with removable media that is programmed with the contents of the page.

12. A system in accordance with claim 1, wherein the broadcast device comprises a system that is programmed with the content of a plurality of books, and wherein the reader may select one of the plurality of books.

13. A system in accordance with claim 1, wherein the guide sheet is substantially transparent, and is configured to be placed over the selected page.

14. A system in accordance with claim 1, wherein the guide sheet has sufficient sensitivity to interact with the pointing device when placed under multiple pages of the book.

15. A system in accordance with claim 1, further comprising an adjustable frame configured to conform to a size and shape of a book, the guide sheet being hingedly connected to the adjustable frame.

16. A system for audio-enhanced reading, comprising:
a) a guide sheet, configured to be placed on top of, underneath, and between selected pages of pre-existing media and configured to interact with a pointing device to jointly identify the relative position of the pointing device with respect to the guide sheet; and
b) an audio broadcast device, configured to receive a relative position of the pointing device with respect to the guide sheet, and to provide audio output corresponding to contents of the page at the identified location.

17. An interactive reading system, comprising:
a) a guide sheet configured to be placed on top of, underneath, and between pages of pre-existing media, and to allow coordinate locating of images on the page; and
b) an output device configured to be interactive with the guide sheet and to provide output from a database associated with the reading material related to a selected image on the page, based upon (i) the identity of the reading material, (ii) the selected page, and (iii) a selected coordinate location on the page.

18. An interactive reading system in accordance with claim 17, wherein the output is selected from the group consisting of audio output and video output.

19. A method for reading, comprising the steps of:
a) placing a guide sheet on top of, underneath, and between pages of pre-existing media;
b) contacting a selected location relative to the page;
c) detecting the location of said contact via the guide sheet; and
d) broadcasting, through an output device, output corresponding to content of the page at the selected location from a database of information associated with the reading material.

20. A method in accordance with claim 19, wherein the guide sheet is substantially transparent and is placed over the page, and the step of contacting the selected location relative to the page comprises contacting a position on the guide sheet.

21. A method in accordance with claim 19, wherein the step of contacting the selected location relative to the page comprises contacting the selected location in a specified manner so as to provide input to the output device.

22. A method in accordance with claim 21, wherein the step of contacting the guide sheet in a specified manner includes a step selected from the group consisting of (i) tapping the guide sheet twice to indicate page advance, and (ii) tapping the guide sheet three times to request the definition of a word.

23. A method in accordance with claim 19, wherein the step of contacting a position on the guide sheet comprises contacting the guide sheet with a handheld stylus.

24. A method in accordance with claim 19, further comprising the step of electronically identifying the reading material so as to select the correct database.

25. A method in accordance with claim 19, wherein the guide sheet is placed under the page, and the step of contacting the selected location relative to the page comprises physically contacting a position on the page.

26. A system for enhancement of books, comprising:
a) a guide sheet, having a positional detection system, configured to be aligned with and placed on top of, underneath, and between selected pages of pre-existing media;

b) a pointing device, configured to interact with the positional detection system of the guide sheet, so as to allow the positional detection system to detect a coordinate position of interaction of the pointing device with the guide sheet; and c) a broadcast device, configured to identify the coordinate position, and to provide output corresponding to contents of the page at the identified location.

27. A system in accordance with claim 26, wherein the positional detection system is selected from the group consisting of conductive contact sensors, capacitive contact sensors, magnetic sensors, and an optically detectable position pattern.

28. A system in accordance with claim 26, wherein the guide sheet is substantially transparent, and is configured to be placed over the selected page.

* * * * *